March 14, 1967 A. G. CARTER 3,308,902
FAIL-SAFE AUTOMATIC BELT ANCHOR SYSTEM
Filed Nov. 19, 1964 3 Sheets-Sheet 2
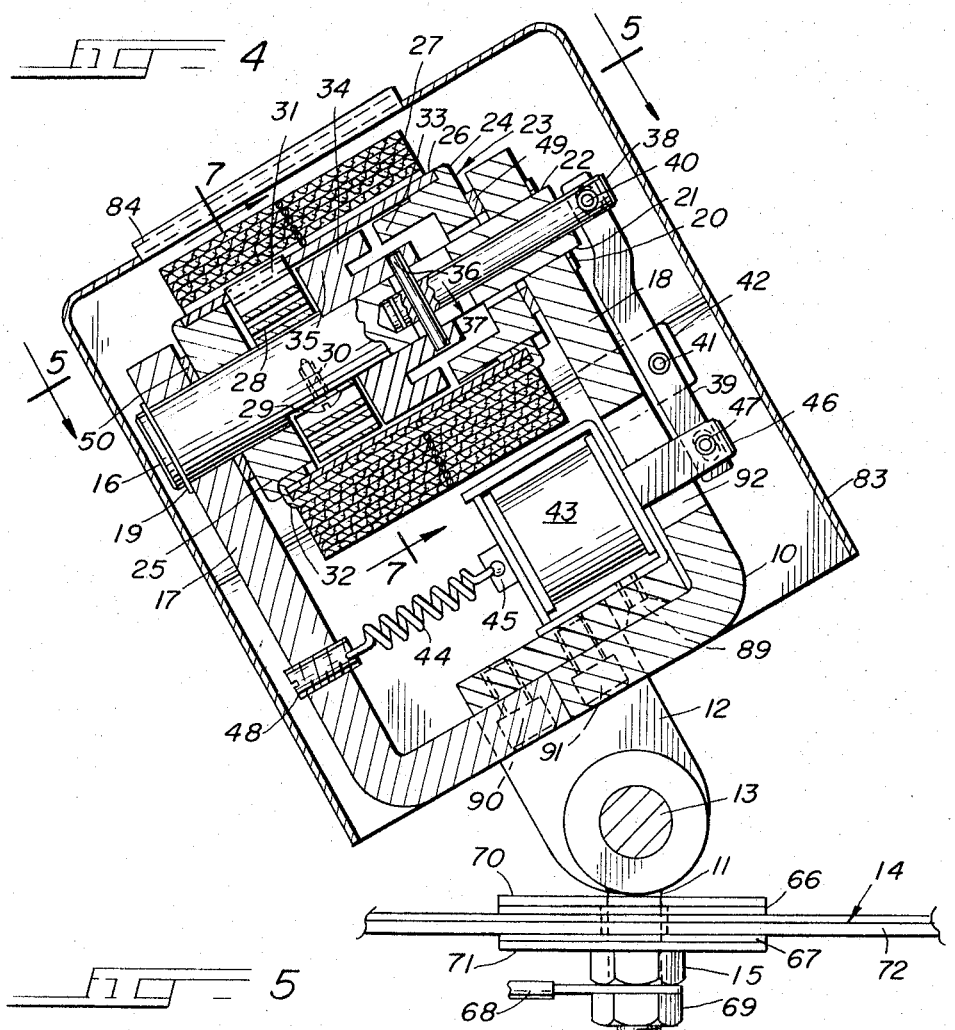
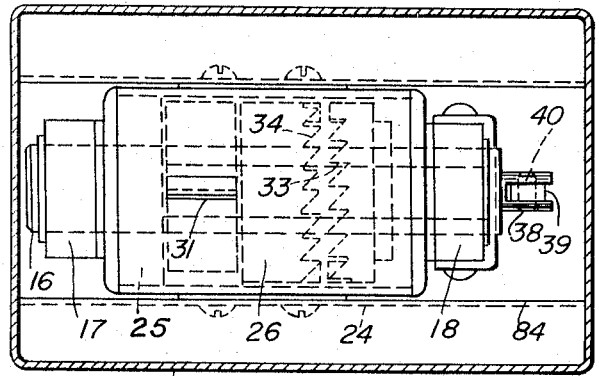
INVENTOR.
ANDREW G. CARTER
BY
ATTY.

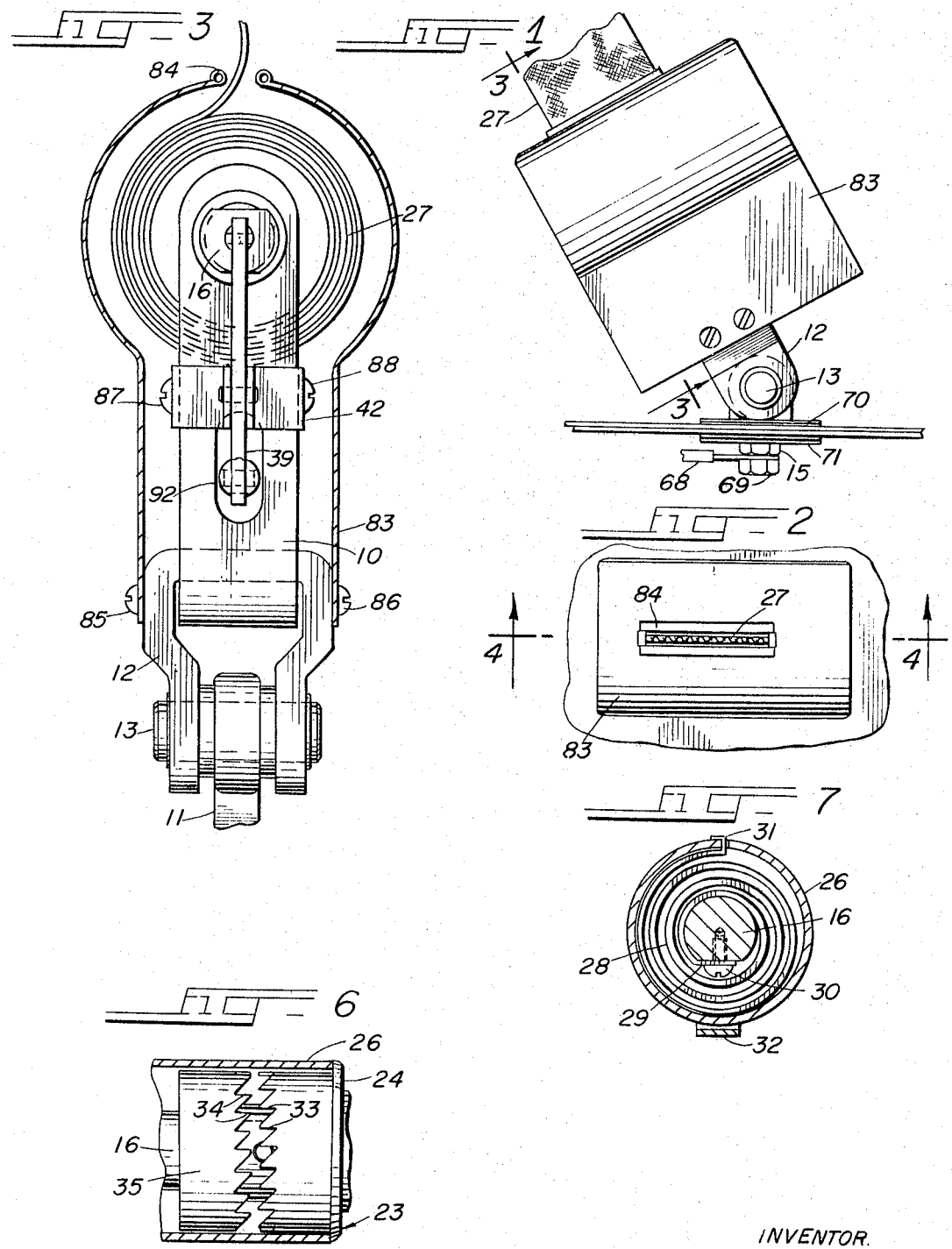

March 14, 1967
A. G. CARTER
3,308,902
FAIL-SAFE AUTOMATIC BELT ANCHOR SYSTEM
Filed Nov. 19, 1964
3 Sheets-Sheet 3
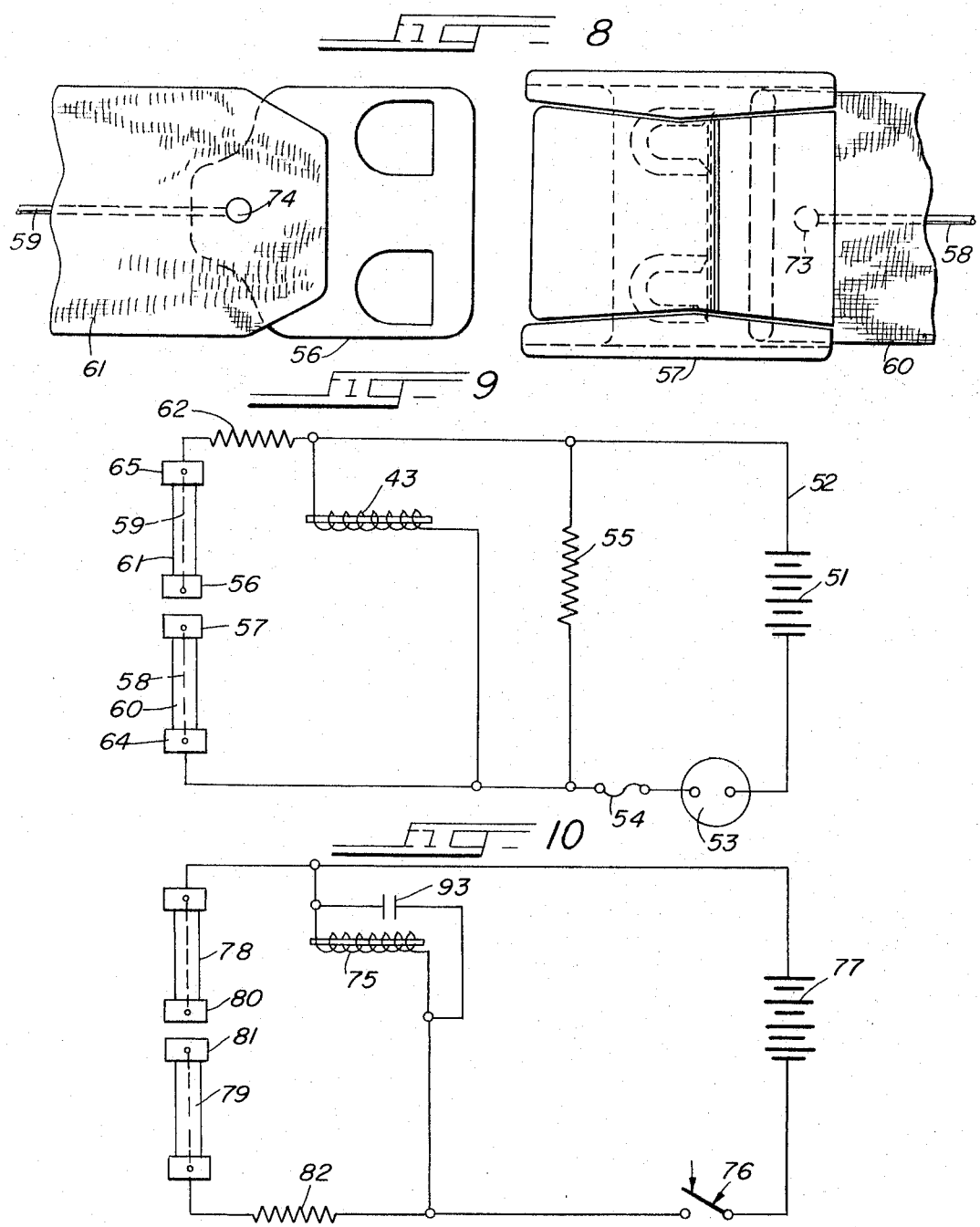
INVENTOR
ANDREW G. CARTER
BY

United States Patent Office

3,308,902
Patented Mar. 14, 1967

3,308,902
FAIL-SAFE AUTOMATIC BELT ANCHOR SYSTEM
Andrew G. Carter, 2930 Lake Drive SE., Grand Rapids, Mich. 49506
Filed Nov. 19, 1964, Ser. No. 412,557
16 Claims. (Cl. 180—82)

This invention relates to safety belt installations in vehicles. The full value of a safety belt can only be realized if the belt is properly adjusted to remove excessive slack. The adjustment procedure is admittedly an inconvenience, and the tendency is to leave too much slack rather than take the time to do the job correctly. Crash conditions apply forces of such magnitude that the slack is instantly removed, and the amount of slack represents distance that the wearer of the belt is free to move into the vehicle structure and become injured.

This problem has been aggravated by the appearance on the market of biased roll-up devices designed only to wind up the disconnected belt sections so that they do not lie loosely on the seat when the belt is not in use. These devices are extremely dangerous, as passengers rarely realize that the amount of belting remaining in these devices when the belt is coupled constitutes slack. The light biasing action (about like that of a curtain roller) gives a deceptive sense of security. In order to provide enough belt length to accommodate all possible users, and also to accommodate the full range of the seat adjustment, there will inevitably be a considerable amount of belting wound up on the take-up device after the belt has been coupled supposedly ready for use. Crash conditions will instantly apply enough tension to the belt to pull all of the stored belting from the take-up device, and permit the wearer a sufficient freedom of movement to present a serious danger.

It is the purpose of the present invention to provide all of the convenience of the biased roll-up devices without the danger associated with them, and to provide a proper belt adjustment to suit the individual wearer without the necessity for manual manipulation beyond coupling the buckle sections together. In the preferred form of the invention, a gentle biasing action is applied to a reel containing the belting, and this reel remains locked against pay-out of the belting during all operating conditions to which the vehicle may be normally subjected. This locking action is releasable only under certain conditions which cannot be encountered during the operation of the vehicle, with the result that the entire system has a "fail-safe" characteristic which eliminates dependence upon the continued functioning of other equipment. Preferably, the control of the locking action for the reel is centered in the ignition switch of the vehicle in such a manner that the reel is locked when the ignition switch is turned on and the belt is connected.

In the preferred form of the invention, the locking action is directed exclusively against pull-out of the belt from the reel, with the biasing action remaining in an inward direction. It is thus possible for the user of the belt to couple it with considerable amount of slack, with the reel-biasing then proceeding immediately to remove the unnecessary slack as the user releases the buckle sections from his grasp.

In the preferred form of the invention, the releasing actuator is in the form of a solenoid, and the complete failure of the electrical system in the automobile (as might occur in a serious crash) will result in the inability of the solenoid to release the reel lock. The locking action is maintained through a fixed biasing provided by a permanent spring, and the security of the entire system is thus rendered independent of the continued functioning of the electrical system of the vehicle.

The several features of the invention will be analyzed further through a discussion of the particular embodiment illustrated in the accompanying drawings. In the drawings:

FIGURE 1 is a side elevation of the preferred form of the lockable take-up reel associated with the invention.

FIGURE 2 is a view looking at the top of the device shown in FIGURE 1, from the direction of the emerging belt.

FIGURE 3 is a section on the plane 3—3 of FIGURE 1, on an enlarged scale.

FIGURE 4 is a section on the plane 4—4 of FIGURE 2, on an enlarged scale over that of FIGURE 2.

FIGURE 5 is a section on the plane 5—5 of FIGURE 4, without belting on the reel.

FIGURE 6 is a fragmentary view showing the rotatively fixed clutch member and the clutch portion of the reel.

FIGURE 7 is a section on the plane 7—7 of FIGURE 4.

FIGURE 8 is a plan view showing the portions of a safety belt buckle disconnected from each other, but attached respectively to sections of the safety belt.

FIGURE 9 is a circuit diagram showing an arrangement of the system for releasing the locking action of the anchor device.

FIGURE 10 is a circuit diagram of a modified form of the invention.

*Anchor reel mechanism*

The invention centers in the control and construction of the anchor reel shown in FIGURES 1 through 7 of the drawings. This reel includes the U-shaped frame 10 pivotally connected to the eye-bolt 11 by the shackle 12 and the pin 13. The eye bolt 11 traverses a suitable hole in the floor structure 14 of a vehicle, and is secured in position by the nut 15.

A shaft 16 extends between the ends 17 and 18 of the U-shaped configuration of the frame 10, and the shaft is held axially in position by the presence of the snap-rings 19 and 20. The shaft 16 has opposite chordal flats 21 and 22 which are received in a similarly-shaped opening in the side 18 of the frame to produce a non-rotative engagement of the shaft with respect to the frame.

A reel 23 is formed by the opposite ends 24 and 25 interconnected by the cylindrical shell 26 which receives the belting 27. A spiral spring 28 has its inner end 29 secured to the flat 21 on the shaft 16 by the screw 30, with the outer end 31 engaging a suitable opening in the shell 26 of the reel to bias the reel with respect to the frame in a direction to wind up the belt 27 with a relatively light action for the purpose of removing slack from the belt. The inner end of the belt is secured to the shell 26 by the clip 32.

The left extremity of the end 24 of the reel terminates in a series of inclined teeth 33, as best shown in FIGURE 6. These teeth form a clutch portion of the reel, and are engageable with the teeth 34 of the clutch member 35 mounted for limited axial movement on the shaft 16. The clutch member 35 engages the shaft with an opening conforming to the flat surfaces 21 and 22, resulting in a non-rotative engagement of the clutch member 35 with respect to the shaft. The axial movement of the clutch member 35 is controlled by the pin 36 traversing the opposite slots 37 in the sidewall of a tubular portion of the shaft 16. The pin 36 also traverses the actuated rod 38 pivotally connected to the lever 39 by the pin 40. This lever is supported on a fulcrum 41 supported on the bracket 42 mounted on the frame 10. Movement of the lever 39 is controlled by the action of the solenoid 43 and the spring 44. The solenoid bar 45 has a non-ferrous extension 46 pivotally connected to the lever 39 by the pin 47 and the spring 44 extends between the opposite extremity of the bar 45 and an adjustable screw 48 engaging the side 17 of the frame 10 to control the tension on the spring 44. A moment's analysis of this arrangement establishes that the normal condition of the reel, with the solenoid 43 inactive, results in the placement of the bar 45 to the left extremity of its freedom of movement by the action of the spring 44, with corresponding clockwise rotation of the lever 39 and resulting movement to the right of the clutch member 35. This produces interengagement of the teeth 33 and 34, and a locking of the reel 23 against rotation. Energizing the solenoid 43 produces movement to the right of the bar 45 to the position shown in FIGURE 4, resulting in disengagement of the reel 23 from the locking function, and corresponding freedom of the reel to rotate against the action of the spring 28. It should be noted that the end 24 of the reel has a circular hole accommodating the shaft 16 so that the chordal flats 21 and 22 are not engaged. The spacing washers 49 and 50 serve to position the reel axially between the ends 17 and 18 of the frame, and the assembly of this device is an obviously very simple procedure.

*Control of the releasing mechanism of the anchor reel*

The anchoring device described above has the notable characteristic that it is a "fail-safe" type of device, in the sense that failure of power will leave the unit in a locked condition. The operation of the solenoid 43 serves to momentarily release the locking action under particular conditions, and only under those conditions. The failure of the electrical circuit to the solenoid cannot conceivably leave the device in a condition where in the belt 27 is not positively anchored. Since it is desirable that the belt sections be gently tightened against the body of a wearer after the belt is coupled, the strength of the spring 28 should be sufficient to rotate the reel 23 when the teeth 33 and 34 are held in engagement by the action of the spring 44. The slant of the teeth produces a ratchet-type action in which the reel may be moved by the spring 28 in a direction to wind up the belt without completely blocking this movement by the locking mechanism. It is also desirable that the belt section should be wound up when the belt is disconnected and not in use, so that they will not take random positions on the seat of the vehicle which will interfere with the occupancy of the seat. This characteristic may be accomplished either by the ratchet action referred to above, or by the disengagement of the locking action when the belt is disconnected. Stated another way, it is desirable that the belt should only be capable of being pulled out under conditions which are not encountered during the normal operation of the vehicle. This is accomplished in the arrangement shown in FIGURE 9 by the connection of the solenoid 43 in a particular relationship with the ignition system of the vehicle. This system includes the battery 51 and the conventional ignition circuit which is indicated generally at 52. This circuit is controlled by the off-on ignition switch 53 and the fuse 54. A control resistor 55 is placed in series relationship with respect to the battery 51, and in position to have the circuit to the resistor controlled by the position of the switch 53. The voltage drop across the resistor 55 is applied to the solenoid 43, and this voltage becomes effective when the portions 56 and 57 of the buckle of the safety belt are disconnected. As soon as these portions are connected, the conductive wires 58 and 59 incorporated in the belt sections 60 and 61, respectively, establish a shunt circuit which has the effect of de-energizing the solenoid 43, and permitting the spring 44 to again bring the locking action into engagement. The energizing of the release system only under conditions encountered when the vehicle is operating prevents drainage of the battery 51 when the car is standing with the engine turned off. With the arrangement shown in FIGURE 9, this can be accomplished by utilizing the existing battery 51 conventionally provided in the vehicle, and the purpose of the resistor 55 is merely to establish a voltage between convenient points of connection at a suitable magnitude to operate the solenoid 43. When the belt is coupled to provide the short circuit through the conductor wires 58 and 59, a limiting resistor 62 will prevent excessive flow of current which might create a heat problem. This resistance can also be incorporated in other circuit components. The circuit through the conductor wires 58 and 59 will proceed through the portions of wire that are wound upon the reel 23, and the extreme ends of these wires are bonded to the shells 26 of the anchor reels indicated generally at 64 and 65. The current will pass through the ends 24 and 25 of the reel into the shaft 16, through the frame 10, and into the eye bolt 11 through the shackle 12 and the pin 13. The eye bolt should be insulated from the floor structure 14 by the insulating washers 66 and 67, one of which has a central tubular portion surrounding the shank of the eye bolt 11. The wire 68 may then be incorporated in the electrical circuit shown in FIGURE 9. This wire is secured to the eye bolt by the nut 69, and the stress of the eye bolt is transferred to the floor structure through the large diameter metal washers 70 and 71 so that the loading is distributed over a larger area of the sheet metal floor panel 72. At the opposite ends of the belt sections from the anchoring devices, the conductor wires 58 and 59 are bonded to the buckle portions 56 and 57 as shown at 73 and 74.

Referring to the modification shown in FIGURE 10, an arrangement is shown which need not utilize the primary battery of the vehicle, nor the ignition switch. An arrangement for activating the release solenoid 75 during the normal operating conditions of the vehicle (to avoid excessive battery drainage) is provided by the presence of the pressure-sensitive switch 76 which is installed to close the circuit through the battery 77 only when an occupant is present in the seat of the vehicle. Under these conditions, voltage is applied across the coil of the solenoid 75 until that circuit is de-energized by the shunt connections established through the conductive wires in the belt sections 78 and 79 as the buckle portions 80 and 81 are coupled together. The limiting resistance 82 is preferably incorporated as discussed previously. It is conceivable that the release mechanism could be arranged to supply voltage to the solenoid 75 continually, regardless of the operating conditions of the vehicle. If one were willing to continually recharge the batteries, or if the vehicle were in substantially continuous operation anyway, this would be permissible. In any event, the coupling of the belt buckle should instantly terminate the functioning of the release so that the belt sections are incapable of being pulled out after this event has taken place, and the possibility of release must also terminate on failure of the electrical system.

For purposes of appearance and for protecting the interior mechanism of the anchor reel, it is preferable to incorporate a housing 83 having an opening 84 defined at least along one edge by a rolled section of the sheet metal of the housing to provide a rounded surface to minimize the abrasion on the belt. In the illustrated device, the housing 83 is secured to the frame 10 by screws as indicated at 85 and 86 engaging the shackle portion 12 of the frame 10. The mounting of the pivot bracket 42 to the frame is also subject to several options, the illustrated arrangement involving the securing of the opposite portions of the bracket to the frame by screws shown at 87 and 88. The mounting of the conventional solenoid 43 may also be incorporated in the shackle 12 through the use of the screws 89. In the illustrated construction, the frame 10 is composed of two sections which are connected at the shackle 12 by the screws 90 and 91. These latter arrangements are subject to wide variations as matters of choice. With the positioning and mounting of the solenoid 43 as shown, the extension 46 of the solenoid bar 45 is accommodated by the clearance opening 92 of the frame 10, and the arrangement of most of the components of the unit substantially within the space defined by the opposite sides of the frame 10 provides an extremely compact device and an excellent transfer of stresses.

In the circuit arrangements shown in FIGURES 9 and 10, the selection of certain types of circuit components (such as solenoid coils and coiled resistors) may result in the presence of a substantial amount of inductance in the circuit. The separation of the buckle portions on disconnecting the belt will therefore produce a considerable instantaneous voltage that may cause either objectionable sparking, or an uncomfortable shock delivered to the hand of the wearer. This can be compensated for by incorporating a condenser 93 in a shunt relationship with the belt, as shown in FIGURE 10. If desired, the circuit through the belt may control a relay in the shunt circuit around the solenoid 75, and thus reduce the current through the belt wires. A relay may also be used in the place of the solenoid 75, with the output of the relay controlling the latch solenoid. In any of these arrangements, the components must be arranged to provide the fail-safe characteristics referred to above.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with a vehicle having a voltage source and an ignition system including a switch, and also having a safety belt including a buckle having portions connecting opposite sections of said safety belt, a terminal device for said safety belt, said device comprising:
   a frame normally secured to said vehicle;
   a shaft mounted in said frame;
   a reel receiving an end of at least one of said belt sections, said reel being rotatable with respect to said frame and mounted on said shaft;
   reel biasing means urging said reel to rotate with respect to said frame to wind up said belt section;
   locking means engageable and disengageable with said reel to fix said reel with respect to said frame;
   locking-biasing means urging said locking means into engagement;
   means including a solenoid for disengaging said locking means;
   conductor wires electrically connected to said buckle portions, respectively, and
   electric circuit means connecting said solenoid to said voltage source, and also said conductor wires in shunt relationship with said solenoid when said buckle portions are coupled.

2. A device as defined in claim 1, wherein said frame is pivotally connected to said vehicle.

3. A device as defined in claim 1, wherein said conductor wires are incorporated in said belt sections.

4. A device as defined in claim 1, wherein said frame has a U-shaped configuration, with said shaft extending between the ends thereof.

5. A device as defined in claim 1, wherein said shaft is fixed with respect to said frame, and said locking means includes a clutch member fixed against rotation with respect to said shaft.

6. A device as defined in claim 5, wherein said clutch member is axially movable on said shaft.

7. A device as defined in claim 5 wherein said reel has a clutch portion axially engageable with said clutch member.

8. A device as defined in claim 7, wherein said clutch member is axially movable to and from engagement with said clutch portion, and said reel is axially fixed with respect to said shaft.

9. A device as defined in claim 7, wherein said clutch member is disposed within said reel, and said shaft has a tubular portion with a slot in the wall thereof, and wherein said locking means includes a rod slidably received in said tubular portion and a pin traversing said slot and connecting said clutch member and said rod.

10. A device as defined in claim 7, wherein said clutch member and clutch portion have interengageable teeth, respectively, and said teeth are inclined to provide locking action in a direction opposite to the action of said reel-biasing means, and said reel biasing means is of sufficient strength to rotate said reel against the resistance provided by said lock-biasing means and the said slanted teeth.

11. A device as defined in claim 9, wherein said frame has a U-shaped configuration, and said solenoid is mounted within said frame on an axis parallel to said shaft, and wherein said locking means also includes a lever pivotally mounted on said frame and connected to said rod and to said solenoid.

12. In combination with a vehicle having a voltage source and also having a safety belt including a buckle having portions connecting opposite sections of said safety belt, an anchor system for at least one of said belt sections comprising:
   a reel having a frame normally secured to said vehicle, said reel receiving an end of at least one of said belt sections;
   biasing means urging said reel to rotate in a direction to wind up said belt section;
   disengageable locking means for preventing rotation of said reel at least in an unwinding direction;
   locking-biasing means urging said locking means into engagement; and
   releasing means operably associated with said locking means to disengage said locking means in response to said buckle portions being uncoupled, said releasing means including a resistor in series relationship with said voltage source and said ignition switch, said solenoid actuator being in shunt relationship with said resistor, and said releasing means also including electric circuit means in shunt relationship with said resistor and incorporating said buckle portions as a conductive unit when coupled.

13. An anchor system as defined in claim 12, wherein said voltage source is the voltage source for said ignition system.

14. An anchor system as defined in claim 12, wherein said releasing means operates in response to said buckle portions being uncoupled exclusively during operating conditions of said vehicle.

15. An anchor system as defined in claim 14, wherein said operating conditions are determined by the position of an ignition switch on said vehicle.

16. An anchor system as defined in claim 14, wherein said operating conditions are determined by a pressure-sensitive switch responsive to the presence of an occupant on a seat of said vehicle.

References Cited by the Examiner

UNITED STATES PATENTS

| | | | |
|---|---|---|---|
| 1,956,978 | 5/1934 | Nafziger | 180—82 |
| 2,708,966 | 1/1955 | Davis. | |
| 2,855,028 | 10/1958 | Matthews | 280—150 X |
| 2,883,123 | 5/1959 | Finnigan | 280—150 X |
| 3,200,370 | 8/1965 | Rush | 180—82 X |

FOREIGN PATENTS

| | | |
|---|---|---|
| 237,466 | 2/1962 | Australia. |

KENNETH H. BETTS, *Primary Examiner.*